Aug. 25, 1964
T. D. SHARPLES
3,146,434
SIGNAL MEANS FOR ROTATING MACHINERY
Filed May 1, 1963
2 Sheets-Sheet 1
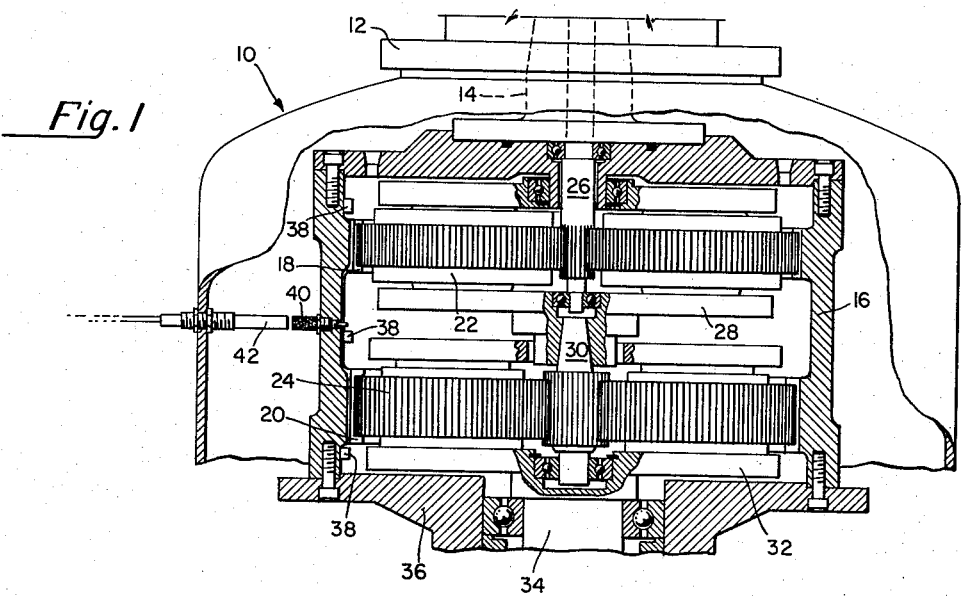
Fig. 1
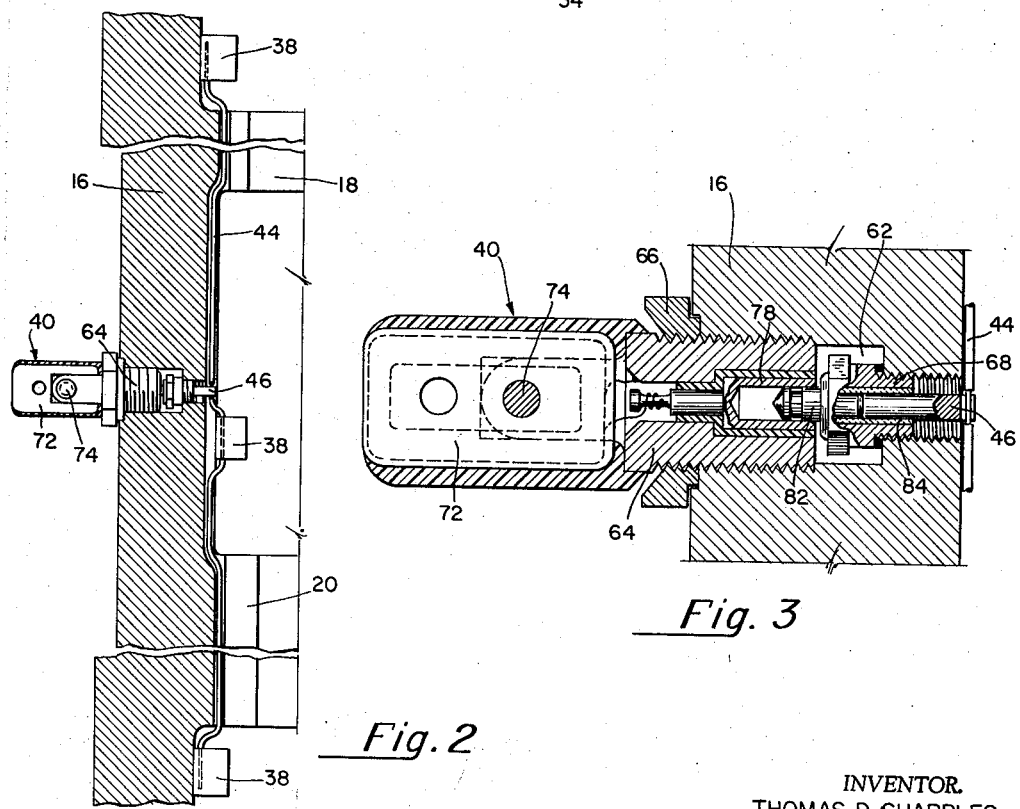
Fig. 2
Fig. 3
INVENTOR.
THOMAS D. SHARPLES
BY Dallett Hooper
ATTORNEY

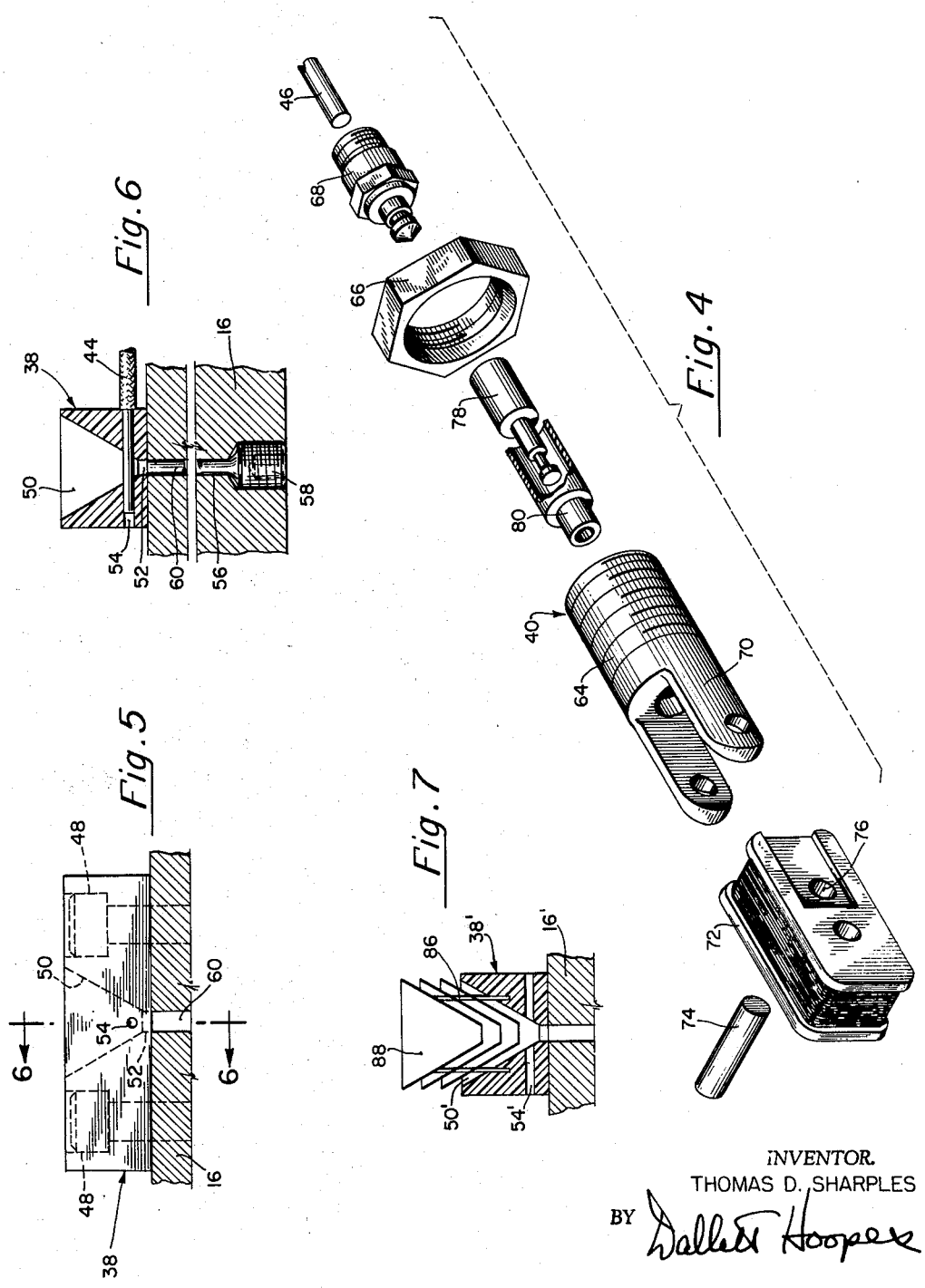

United States Patent Office 3,146,434
Patented Aug. 25, 1964

3,146,434
SIGNAL MEANS FOR ROTATING MACHINERY
Thomas D. Sharples, Lansdale, Pa., assignor to Pennsalt Chemicals Corporation, a corporation of Pennsylvania
Filed May 1, 1963, Ser. No. 277,303
6 Claims. (Cl. 340—267)

This invention relates to warning devices for machinery. More specifically, this invention relates to an imminent breakdown warning device for a rotating gear box.

In service today in varied applications are gear boxes having housings which rotate, the housing being a moving element of the gear system. One application of such a structure is in the centrifuge field wherein it is common to provide a rotating centrifuge bowl with an internal discharge element rotating relative to the bowl. An example of such an arrangement may be noted in the Patent 3,061,181 which issued October 30, 1962, on an application filed by Fred P. Gooch. In such centrifuge drive arrangements the gear box itself is rotated by a motor-driven belt. The gear box housing internally presents a pair of spaced ring gears which comprises two stages of plant gears respectively. The sun gear for the first stage is held stationary from outside of the gear box. The carriage for the first stage of planetary gears drives the second stage sun gear and the carriage for the second stage planetary gears drives the internal conveyor. The centrifuge bowl is attached directly to the gear box housing.

Such structures are invariably expensive and great precautions are taken to assure their long life. One enemy of such centrifuge gear boxes are the transient forces which develop as a result of vibration during the discharge of difficult-to-convey solids from the centrifuge. Such transients place momentary strain of tremendous magnitude on the various gear teeth, especially the hardened gear teeth of the sun gear and on the bearings which support the sun gears and carriages. The recurrence of such transients at high rates has led, for instance, to the destruction of an outer race of a ball bearing and the consequent escape into the gear box of a bearing ball. Such transients have also broken away portions of the teeth of the sun gears which are hard and brittle and bear great pressure when the device is in operation.

The free presence of a bearing ball or a sun gear tooth portion inside the box can lead to tremendous damage to the other parts of the system. Hurled outwardly under centrifugal force, the displaced element may become lodged in the meshing gears to effect further destruction of the hardened sun gear through jamming, not to mention violently disfiguring the shape of the ring gear itself. After such a breakdown a complete and expensive rebuilding of the entire gear box system or its replacement is often necessary.

In stationary gear box systems which are provided with circulating lubrication systems, it has been common to place in the system means to detect the presence in the lubricating oil of metal particles. The detection of such particles is valuable to signal an imminent breakdown since the particles are symptoms of unusual wear which may lead to the escape of a bearing ball, fracture of a gear tooth, etc. Such means have comprised spaced contacts which are bridged by the metal particles to close an alarm circuit. However, in a rotating gear box system as above described the provision of an alarm system has appeared more complicated primarily because of the moving nature of the gear box itself and the frequent absence of a lubrication circulating line.

This invention is directed toward an imminent breakdown warning device for a rotating gear box which takes advantage of the natural lubricating flow of oil in the gear box and of the centrifugal field in which it operates.

Further, the invention provides means for communicating intelligence of the presence of metal particles to a stationary alarm despite the moving condition of the gear box.

These and other features will be evident from the drawings and the following description of preferred forms of the invention especially with reference to the drawings in which:

FIGURE 1 is a fragmentary sectional view partly in elevation of a rotating centrifuge gear box embodying the invention;

FIGURE 2 is an enlarged fragmentary view of a portion of FIGURE 1 showing detector apparatus suitable for use in the invention;

FIGURE 3 is an enlarged fragmentary sectional view of a portion of FIGURE 2;

FIGURE 4 is an enlarged exploded view of a signal coil of an apparatus embodying the invention;

FIGURE 5 is an enlarged fragmentary sectional view of a detector of an apparatus embodying the invention;

FIGURE 6 is a sectional view on the line 6—6 of FIGURE 5; and

FIGURE 7 is a sectional view of a modified form of detector element comparable to that shown in FIGURE 6.

Referring more specifically to the drawings, a centrifuge having a gear box embodying the invention is generally designated 10 in FIGURE 1. It comprises a frame 12 rotatably mounting a drive shaft 14 which is driven by means not shown. Dependent from the drive shaft is a gear box having a housing 16. Internally the gear box presents the ring gears 18 and 20 and contains two sets of planetary gears 22 and 24 engaging the ring gears respectively. The planetary set 22 engages the central sun gear 26 which is normally held stationary from the outside of the machine, and the carriage 28 of the planetary set 22 drives the sun gear 30 which is in turn engaged by the planetary set 24. The carriage 32 of the planetary set 24 is directly connected to and drives the centrifuge conveyor to shaft 34, and the centrifuge rotor 36 is directly attached to the gear box housing 16. In operation the gear box is filled with lubricating oil.

As shown in FIGURE 1 the interior of the gear box housing mounts a plurality of metal particle detectors 38 which are electrically connected to the signal coil 40 mounted externally on the gear box housing. The signal pick-up 42 is supported on the centrifuge frame 12 so that its inner end is adjacent the rotary path of the signal coil.

Referring to FIGURE 2, the metal particle detectors 38 are mounted on the inside of the gear box 16, two being disposed on the outside of the respective ring gears and one inbetween them. The detectors are connected by a single insulated wire 34 which inbetween the detectors is disposed in a channel formed in the gear box housing and in the ring gears themselves. Intermediate its ends the wire 44 has its insulation stripped (FIGURE 3) and is fastened as by soldering to a conductor 46. This conductor is connected to one end of the signal coil 40 while the other end of the coil is grounded to the metal of the gear box housing.

A typical metal particle detector 38 is shown in FIGURES 5 and 6. It comprises a rectangular block made from non-conductive material such as plastic. In either end of the block a bolt hole 48 is formed and through these holes bolts secure the detector to the gear box housing. Centrally the detector is formed with a funnel-shaped opening 50 having its wider end facing the axis of the gear box. The narrower end is open at 52 to the metal of the gear box housing. Through the block intersecting the axis of the funnel-shaped opening, a transverse passage 54 is bored a short distance above the under surface of the detector as shown in FIGURE 5.

This passage receives a portion of the wire 44 which has been stripped of its insulation.

In an actual embodiment the bare wire is disposed with its axis .015" inward from the outer surface of the detector. In this embodiment the wire is of .020" diameter so that the lower surface of the wire is approximately .005" from the conductive metal of the gear box housing.

In the preferred embodiment (FIGURE 6) a small hole 56 is bored through the gear box housing in alignment with the small end of the funnel-shaped opening 50. The outer end of the hole 56 is enlarged and tapped and the hole receives a threaded cleanout plug 58 presenting a thin extension 60 which fits into the hole 56 so that the end of the extension is flush with the inner surface of the housing 16. By means of such structure the detector 38 may be cleaned of accumulated dirt and metal particles by simply removing the clean-out plug 58.

From the above description of the detector 38 it will be noted that in normal operation of the gear box any metal particles inward toward the axis from the upper surface of the detector will move outward, settling under centrifugal force, and will accumulate in the smaller end of the funnel-shaped opening 50. This result is actually facilitated by the violent pumping action of the oil in the gear box by the planetary gears. This action causes a circulation of the oil and any contained metal particles. Once a particle is in the cove-like pocket presented by the opening 50, it is able to settle out to the smaller end under the influence of centrifugal force and remain there. Upon sufficient accumulation of metal particles a circuit-closing bridge will be achieved between metal and the gear box housing 16 at the end of plug 58 and the bare metal wire 44 within the funnel-shaped opening. In the preferred embodiment this bridging short circuits the signal coil 40.

The structure of the signal coil and its mounting is detailed in FIGURES 2, 3 and 4. Referring to FIGURE 3, into the gear box housing 16 is drilled an opening 62. The opening is enlarged adjacent its outer end and tapped to receive a threaded plug 64 held firmly in position by a jamb nut 66. The inner end of the opening is drilled and receives a threaded nipple element 68. As shown best in FIGURE 4 the plug 64 is bifurcated to present a yolk 70 at its outer end. In assembly the yolk 70 holds between its legs the spool 72 secured thereto by a pin 74 through the spool opening 76. The spool may be covered with an insulating layer as shown. On the spol 72 is a winding of relatively fine wire to comprise the coil proper. One end of the wire is connected to a socket 78 held in the plug by an insulating bushing 80: the other end is connected to the metal of the plug 64.

The outer end of the nipple 68 presents a head 82 which is connected to the conductor 46, both the head and the conductor being insulated from the outer metal of the nipple by a ceramic composition 84 comparable to that of an ordinary spark plug.

In assembly the nipple is threaded into the small end of the opening 62 and the inner end of the conductor 46 is secured to the wire 44. The plug 64 with its attached spool and coil electrically connected as shown is screwed into the larger end of the opening 62 so that the socket 78 electrically engages the head 82. By means of the structure shown upon bridging by metal particles of the gear box housing and the wire 44 in one of the detectors 38, the coil on spool 72 will be shorted.

As shown in FIGURE 1 the signal pick-up 42 has its inner end positioned adjacent the rotary path of the signal coil 40. In the preferred form of the invention the pick-up 42 is of the type comprising a permanent magnet disposed on the longitudinal axis of the pick-up and surrounded by a coil of fine wire connected through an amplifier and appropriate relays to a signal means. As the gear box rotates with the signal coil 40 open the magnetic field about the permanent magnet in the pick-up 42 will not be changed significantly.

On the other hand when the coil is shorted and crosses the field about the magnet it generates a magnetic field of its own. This distorts the field about the magnet in the pick-up 42 and the pick-up coil is affected by the distortion. The amplifier magnifying the effect causes actuation of the warning signal means.

In the preferred form of the invention the pick-up is of commercially available form and sold to a number of specifications under the trademark "Electro" by Electro Products Laboratories, Inc., Chicago, Illinois. The signal, in the form of a repeating pulse, at the rotating frequency is preamplified, demodulated with a suitable diode bridge and the resulting direct current signal applied to the bi-stable amplifier of the type manufactured by Norbatrol Electronics Corporation of Pittsburgh, Pa. The output of this unit actuates an alarm circuit.

A variation of a detector comparable to that of FIGURES 5 and 6 is shown in FIGURE 7 and designated 38'. In this variation primed reference numerals are used to indicate the elements which correspond to elements of the preferred embodiment. The modification is noteworthy for the provision of upstanding posts 86 supporting a plurality of spaced aligned frusto-conical discs 88. These discs efficiently settle metal particles in the vicinity, funneling them down in the small end of the opening 50'.

It will thus be seen that the invention takes advantage of the natural circulation of oil within a rotating gear box and centrifugal force to signal imminent destruction of the gear box. Variations are, of course, possible. Thus, while I have explained my invention with the aid of particular embodiments thereof, it is to be understood that I do not wish to be limited to the specific structural details illustrated and described from which departure can be made without departing from the spirit and scope of the invention as defined by the following claims.

I claim:

1. In combination a rotating gear box having an axis of rotation, a detector disposed adjacent the outer end of the greatest internal radius of the gear box housing, the detector presenting a pocket facing generally toward the axis of rotation, electric contacts in the pocket and adapted to be shorted by metal particles held outward between said contacts in the pocket by centrifugal force, and electric signal means connected to said contacts.

2. In combination signal means, a gear box having a housing with a peripheral wall and containing a gear system and mounted for rotation about its own axis, a pair of contacts disposed in fixed spaced relation to each other and in close proximity to each other in the gear box adjacent the peripheral wall, the contacts being exposed to the inside of the gear box housing, a coil mounted on the outside of the peripheral wall of the gear box to rotate therewith, the ends of the coil being respectively connected to the contacts, and a stationary coil mounted outside the gear box adjacent the path of the moving coil, a permanent magnet adjacent the stationary coil, the stationary coil being connected to said signal means whereby the contacts are adapted to be short-circuited by metal particles sedimented in the centrifugal field of the gear box to complete a circuit through the moving coil to distort the field of the permanent magnet and thereby influence the stationary coil to affect the signal means.

3. The combination of claim 2 wherein the gear box has mounted on the inside of its peripheral wall a non-conductive element having a funnel-shaped opening with its larger end facing the axis of rotation of the gear box, the smaller end of the funnel-shaped opening being disposed against the wall of the gear box, a conductive element being disposed in the non-conductive element and extending across the funnel-shaped opening adjacent its smaller end, the wall of the gear box and the portion of the conductive element in the funnel-shaped opening comprising the said pair of contacts.

4. The combination described in claim 3 wherein a plurality of aligned frusto-conical discs are supported inward from the funnel-shaped opening.

5. The combination described in claim 3 wherein the gear box has a hole outward in its housing from the small end of said funnel-shaped opening, and a plug normally closing said hole.

6. In a centrifuge having a gear box mounted for rotation about an axis of rotation, the improvement of a detector disposed adjacent the outer end of the greatest internal radius of the gear box housing, the detector presenting a pocket facing generally toward the axis of rotation, electric contacts in the pocket and adapted to be shorted by metal particles held outward between said contacts in the pocket by centrifugal force, and electric signal means connected to said contacts.

References Cited in the file of this patent
UNITED STATES PATENTS

| | | |
|---|---|---|
| 1,913,436 | Eckstein | June 13, 1933 |
| 2,252,222 | Van Os | Aug. 12, 1941 |
| 2,468,509 | Naob | Apr. 26, 1949 |
| 2,556,390 | Harrison | June 12, 1951 |
| 2,689,277 | Lidmalm | Sept. 14, 1954 |
| 2,963,691 | Yerger | Dec. 6, 1960 |
| 3,027,553 | Sandor | Mar. 27, 1962 |
| 3,060,394 | Maeda | Oct. 23, 1962 |
| 3,105,213 | Richard et al. | Sept. 24, 1963 |